F. McMILLAN.
SAFETY SHUTTER.
APPLICATION FILED JULY 13, 1918. RENEWED MAY 14, 1919.

1,326,409.

Patented Dec. 30, 1919.
2 SHEETS—SHEET 1.

Witness:
John Enders

Inventor
FRANK McMILLAN,
Robert Burns
Atty.

F. McMILLAN.
SAFETY SHUTTER.
APPLICATION FILED JULY 13, 1918. RENEWED MAY 14, 1919.
1,326,409.
Patented Dec. 30, 1919.
2 SHEETS—SHEET 2.
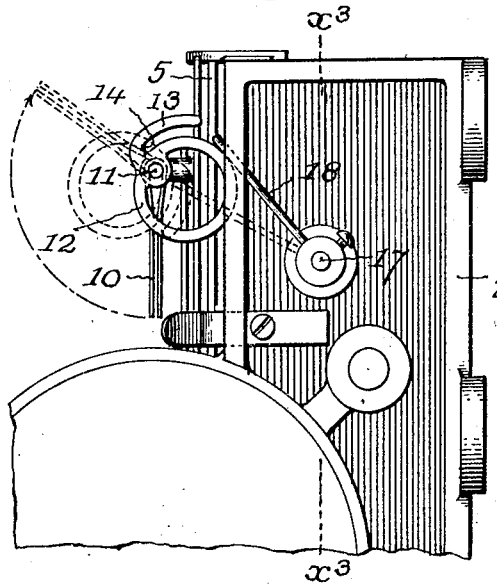
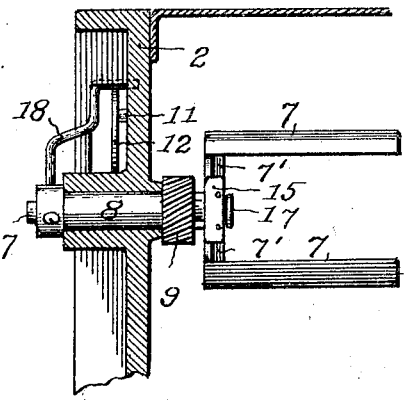
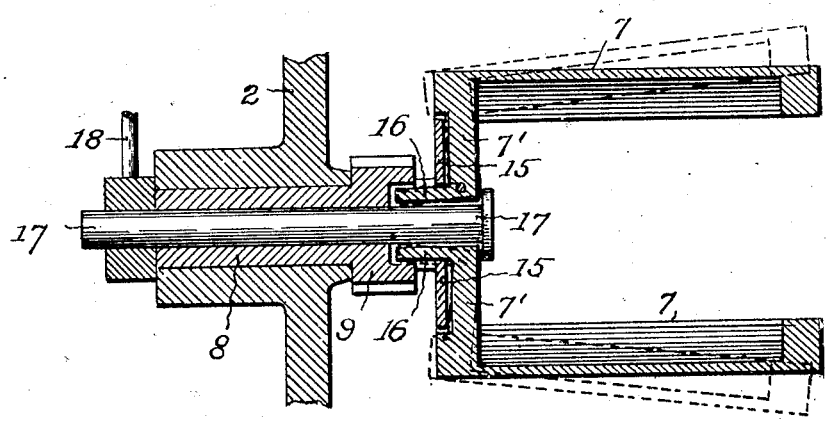
Witness:
John Enders
Inventor
Frank McMillan
by Robert Burns

UNITED STATES PATENT OFFICE.

FRANK McMILLAN, OF GLENELLYN, ILLINOIS, ASSIGNOR, BY MESNE ASSIGNMENTS, TO NATIONAL DROP HEAD PROJECTOR COMPANY, OF FOND DU LAC, WISCONSIN, A CORPORATION OF WISCONSIN.

SAFETY-SHUTTER.

1,326,409.  Specification of Letters Patent.  Patented Dec. 30, 1919.

Application filed July 13, 1918, Serial No. 244,709. Renewed May 14, 1919. Serial No. 297,159.

*To all whom it may concern:*

Be it known that I, FRANK McMILLAN, a citizen of the United States of America, and a resident of Glenellyn, in the county of Dupage, State of Illinois, have invented certain new and useful Improvements in Safety-Shutters, of which the following is a specification.

This invention relates to motion picture machines of the intermittent film feeding type, in which the light passage is closed by a supplementary shutter operatively connected to the film feeding mechanism and adapted to automatically open the light passage when a predetermined speed of rotation in said mechanism is reached, the purpose being to prevent an ignition or firing of the picture film, which is of frequent occurrence, when said film passes slowly through a machine not provided with means to shield the film during such slow movement. And the present improvement has for its object:

To provide a simple and efficient structural formation and association of the light controlling mechanism of a motion picture machine, wherein the shutter performing the usual periodic interruption of the light passage, is adapted to automatically operate a supplementary shutter forming a barrier in said light passage and effect an opening of said supplementary shutter when a predetermined speed of rotation of the mechanism is reached, all as will hereinafter more fully appear.

In the accompanying drawings:—

Fig. 2 is a detail side elevation of the operating mechanism of the supplementary or safety shutter.

Fig. 3 is a detail transverse section on line $X^3$—$X^3$, Fig. 2, showing the primary shutter and its operative connections to the supplementary or safety shutter.

Fig. 4 is an enlarged detail transverse section on line $X^4$—$X^4$, Fig. 1, illustrating the detail construction of the primary light shutter.

Like reference numerals indicate like parts in the several views.

Figure 1:
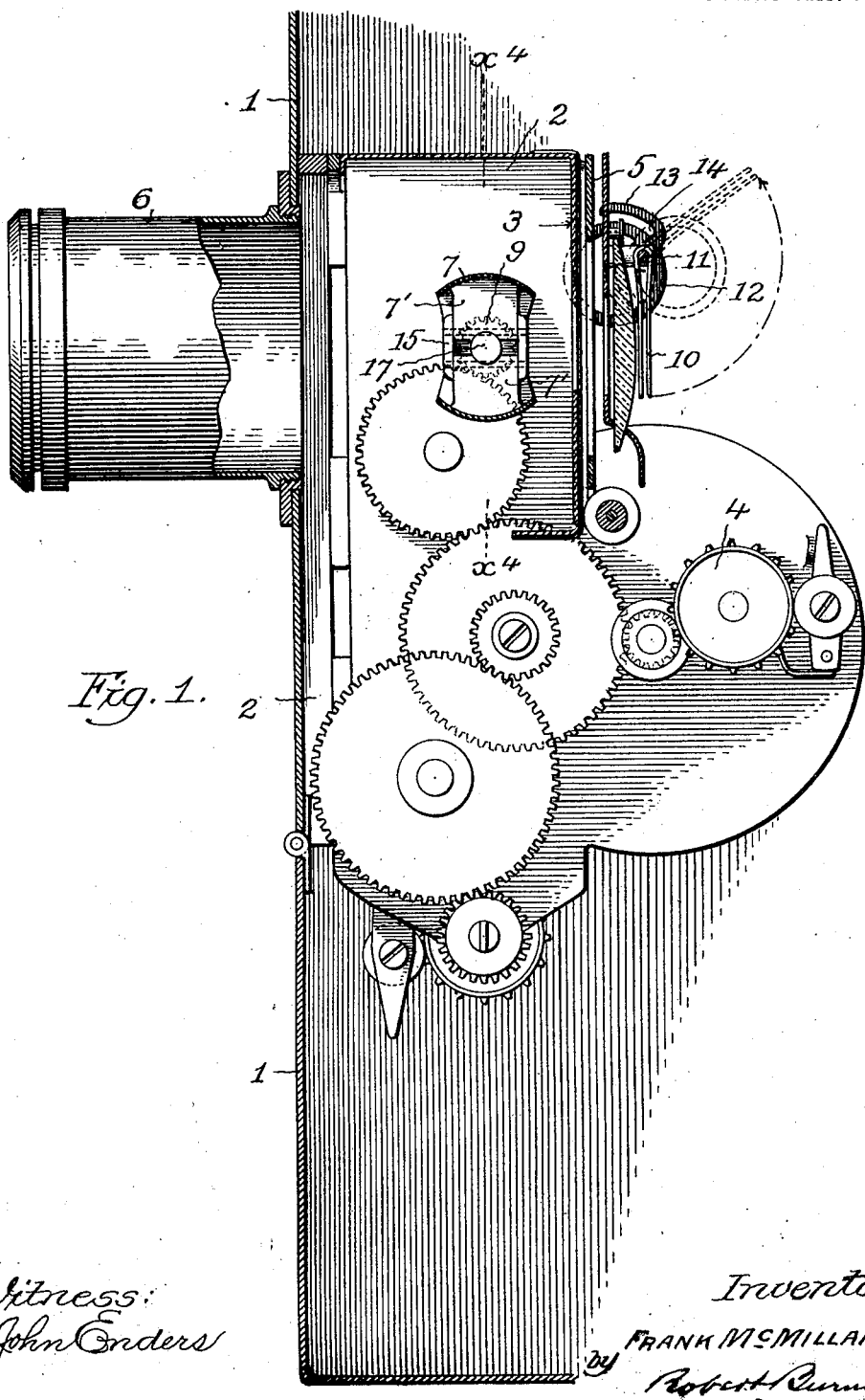
Figure 1 is a central longitudinal sectional elevation of an intermittent film feeding mechanism having the present invention applied.

Referring to the drawings, 1 designates a part of the front wall or of the main casing of a motion picture machine, and upon which the supporting housing or frame 2 of the intermittent film feeding mechanism is carried, as usual in the present class of machines.

3 designates the usual aperture plate behind which the picture film has intermittent vertical movement through the usual intermittently actuated sprocket drum 4, the said film being guided and held to proper vertical travel by a hinged gate 5 properly apertured for the passage of light.

6 designates the usual optical objective of the machine, arranged in line with the light aperture of the plate 3 aforesaid.

7 designates the primary light controlling shutter, arranged intermediate of the aperture plate 3 and the objective 6 and having a carrying shaft 8 provided with a gear wheel 9 forming a part of the train of gearing by which motion is imparted to the film feeding mechanism, light shutter and other parts, so that the same will operate in unison.

The present improvement involves in connection with a film feeding mechanism and primary shutter of a motion picture machine, such as above described, a structural formation and association of parts as follows:—

10 designates a depending supplementary or safety shutter hinged at its upper end to the film gate 5 by a horizontally arranged pivot rod 11, and normally depending at the back of the aperture plate 3, and in the path of the light beams passing to the aperture of said plate, to entirely cut off said rays from the picture film and prevent a firing of the same. Such position of the safety shutter 10 prevails until a predetermined speed of rotation of the operating mechanism is attained when said shutter is automatically moved out of said light path, and permits the passage of the light beams to the picture film and the objective 6, of the machine.

12 designates a swinging arm or member secured to one end of the pivot rod 11 of the safety shutter, and preferably of the ring form shown, attached eccentrically to said pivot rod, and provided with a curved guard finger 13 which has at its point of attachment a stop throat or abutment 14 adapted to limit the extent of the swinging motion which is imparted to said arm or member 12 by the automatic operating mechanism hereinafter described.

In the present improvement the primary shutter 7 consists of a pair of opposed blades, segmental in cross-section, disposed in parallel relation to each other and to the axis of rotation of the shutter, and having at one end carrying arms 7' which are pivoted at opposite sides of the axis of rotation in a carrying hub 15 on the operating shaft 8 of the shutter.

16 designates friction jaws on the carrying arms 7' aforesaid in tangential relation to the pivots of said arms and adapted for frictional engagement with a spindle now to be described.

17 designates a loose spindle arranged centrally in an axial bore of the shutter carrying shaft 8 and held from longitudinal movement by end stop collars, as shown, or other like means.

18 designates a radial arm or finger carried on one end of the spindle 17, with its outer end adapted to have bearing against the curved edge of the aforesaid swinging arm or member 12 of the safety shutter, to impart a swinging movement to said arm 12 and a corresponding rising or opening movement to the safety shutter.

The operation of the present safety shutter mechanism is as follows:—

In an initial operation or starting of the motion picture mechanism, the primary shutter will have a slow rotation and the friction jaws 16 will be out of operative engagement with the loose spindle 17 and will revolve independent of said spindle. As the speed of rotation of the primary shutter nears the required or predetermined degree, the shutter blades, under centrifugal influence will have outward pivotal movement on the pivots of their arms 7' and bring the friction jaws 16 into limited frictional engagement with the loose spindle 17 to impart to said spindle a partial rotation in the direction of the rotation of said jaws. The limited frictional engagement of the jaws 16 just mentioned permits of independent rotation of said friction jaws after the required partial rotation of the spindle 17 has been effected, and during said independent rotation of the friction jaws, the same will act to retain said spindle 17 at the described point of partial rotation.

In the above described partial rotation of the loose spindle 17, a corresponding rocking motion is imparted to the arm 18, and from the same to the swinging arm or member 12 and to the safety shutter 10, which is moved from a closed position indicated in full lines in Fig. 1, to an open position indicated in dotted lines in said Fig. 1. With a stoppage or slowing down in the rotation of the mechanism, the shutter 10 drops at once to its closed position above described.

In the above described opening movement of the safety shutter the operating arm 18 progressively decreases the distance of its bearing point from the axis of the pivot rod 11 of the safety shutter and upon the curved bearing surface of the ring shape arm 12, to effect a progressive increase in the opening movement of the shutter. This has been found of value in attaining an accurate and efficient automatic operation of the mechanism.

Having thus fully described my said invention what I claim as new and desire to secure by Letters Patent, is:—

1. The combination of a primary shutter and a secondary safety shutter disposed in the light path of a motion picture machine, the primary shutter having blades adapted to move under centrifugal influence and operatively connected to the safety shutter, substantially as set forth.

2. The combination of a primary shutter and a secondary safety shutter disposed in the light path of a motion picture machine, the primary shutter having a pair of blades arranged in approximately parallel relation to each other and to the axis of rotation and hinged at one end to a carrying hub, and operative connections between said hinged blades and the safety shutter, substantially as set forth.

3. The combination of a primary shutter and a secondary safety shutter disposed in the light path of a motion picture machine, the primary shutter having a pair of blades arranged in approximately parallel relation to each other and to the axis of rotation and having end arms by which they are pivoted to a carrying hub, a loose spindle associated with said carrying hub and adapted for frictional engagement with the aforesaid end arms, and operative connections between said spindle and the safety shutter, substantially as set forth.

4. The combination of a primary shutter and a secondary safety shutter disposed in the light path of a motion picture machine, the safety shutter having a supporting pivot rod, and the primary shutter having blades adapted to move under centrifugal influence and operatively connected to pivot rod of the safety shutter, substantially as set forth.

5. The combination of a primary shutter and a secondary safety shutter disposed in the light path of a motion picture machine, the safety shutter having a supporting pivot rod, and the primary shutter having a pair of blades arranged in approximately parallel relation to each other and to the axis of rotation and hinged at one end to a carrying hub, and operative connections between said hinged blades and the aforesaid pivot rod of the safety shutter, substantially as set forth.

6. The combination of a primary shutter and a secondary safety shutter arranged in the light path of a motion picture machine, the safety shutter having a supporting pivot rod, an operating member secured to said pivot rod and having a ring shape, the primary shutter having blades adapted to move under centrifugal influence and operatively connected to the aforesaid operating member of the safety shutter substantially as set forth.

7. The combination of a primary shutter and a secondary safety shutter arranged in the light path of a motion picture machine, the safety shutter having a supporting pivot rod, an operating member secured to said pivot rod, said operating member having a ring shape and provided with a peripheral guard finger, the primary shutter having blades adapted to move under centrifugal influence and operatively connected to the aforesaid operating member of the safety shutter, substantially as set forth.

8. The combination of a primary shutter and a secondary safety shutter disposed in the light path of a motion picture machine, a pivot rod forming a support for the safety shutter, an operating member on said pivot rod, the primary shutter comprising a pair of hinged blades adapted to move under centrifugal influence, a carrying hub to which said blades are hinged, a loose spindle associated with said hub and adapted for frictional engagement with the shutter blades, and an arm carried by said loose spindle and having engagement with the operating member on the pivot rod of the safety shutter, substantially as set forth.

9. The combination of a primary shutter and a secondary safety shutter disposed in the light path of a motion picture machine, a pivot rod forming a support for the safety shutter, an operating member on said pivot rod and having a ring shape, the primary shutter comprising a pair of hinged blades adapted to move under centrifugal influence, a carrying hub to which said blades are hinged, a loose spindle associated with said hub and adapted for frictional engagement with the shutter blades, and an arm carried by said loose spindle and having engagement with the aforesaid operating member on the pivot rod of the safety shutter, substantially as set forth.

10. The combination of a primary shutter and a secondary safety shutter disposed in the light path of a motion picture machine, a pivot rod forming a support for the safety shutter, an operating member on said pivot rod, said operating member having a ring shape and provided with a peripheral guard finger, the primary shutter comprising a pair of hinged blades adapted to move under centrifugal influence, a carrying hub to which said blades are hinged, a loose spindle associated with said hub and adapted for frictional engagement with the shutter blades, and an arm carried by said loose spindle and having engagement with the aforesaid operating member on the pivot rod of the safety shutter, substantially as set forth.

Signed at Santa Cruz, Cal., this 3rd day of June 1918.

FRANK McMILLAN.